(No Model.)  2 Sheets—Sheet 1.

C. F. WOOD.
AUTOMATIC ELECTRIC WEIGHING SCALE.

No. 500,045. Patented June 20, 1893.

WITNESSES:
Fred G. Dieterich
Edw. H. Byrn

INVENTOR
Charles F. Wood
BY Munn & Co.
ATTORNEYS.

(No Model.) 2 Sheets—Sheet 2.
C. F. WOOD.
AUTOMATIC ELECTRIC WEIGHING SCALE.
No. 500,045. Patented June 20, 1893.
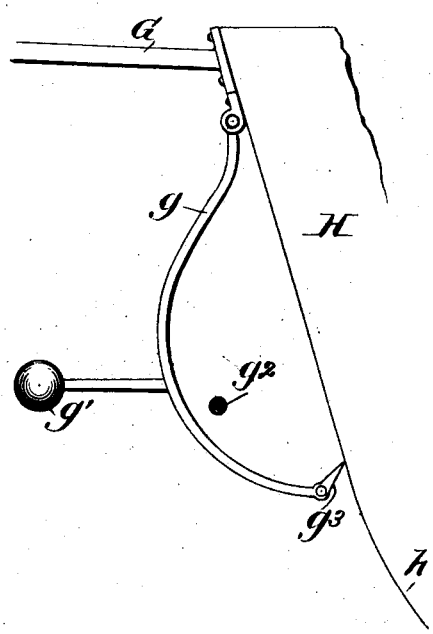
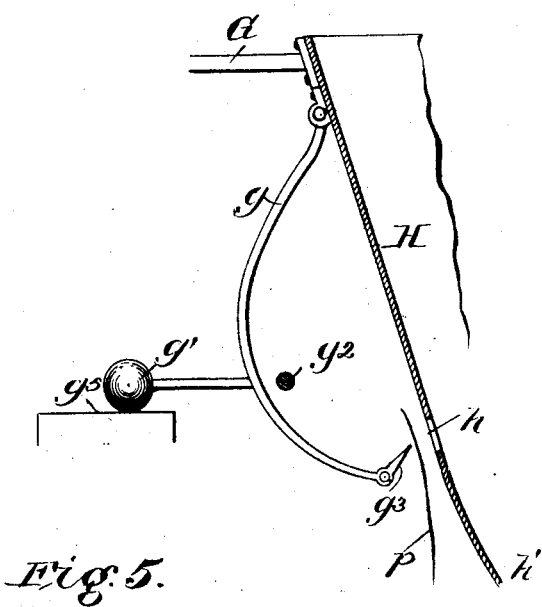
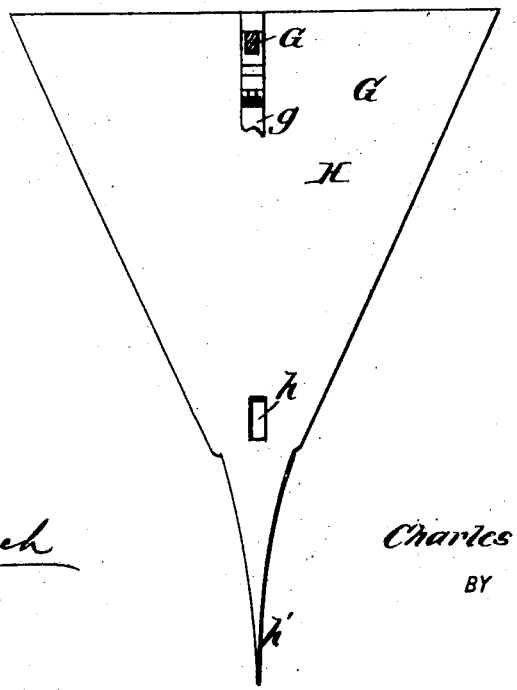
WITNESSES:
Fred G. Dieterich
Edw. N. Byrn
INVENTOR
Charles F. Wood.
BY Munn & Co
ATTORNEYS.

UNITED STATES PATENT OFFICE.

CHARLES F. WOOD, OF RICHMOND, VIRGINIA.

AUTOMATIC ELECTRIC WEIGHING-SCALE.

SPECIFICATION forming part of Letters Patent No. 500,045, dated June 20, 1893.

Application filed August 30, 1892. Serial No. 444,584. (No model.)

*To all whom it may concern:*

Be it known that I, CHARLES F. WOOD, residing at Richmond, in the county of Henrico and State of Virginia, have invented a new and useful Improvement in Automatic Electric Weighing-Scales, of which the following is a specification.

The object of my invention is to provide an automatic electric weighing scale designed mainly for use in putting up in packages a small quantity of seed, or other loose merchandise, and to do this rapidly and accurately, giving to each package a uniform weight of material.

In seed houses, wholesale drug stores, and grocery stores, much time and labor are expended in putting up these small packages of seed, drugs, sample groceries, &c., and my invention is designed to economize this time and labor, and to this end it consists in the peculiar construction and arrangement of an automatic weighing scales which not only weighs the requisite amount and insures uniformity, but also deposits it within paper bags in a rapid and automatic manner as hereinafter fully described.

Figure 1:
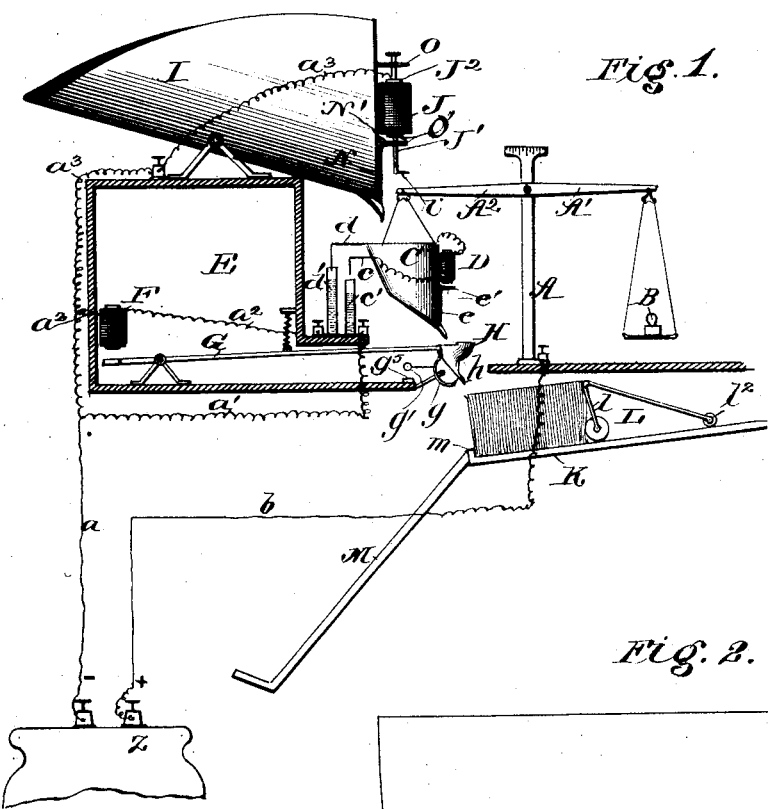
Figure 2:
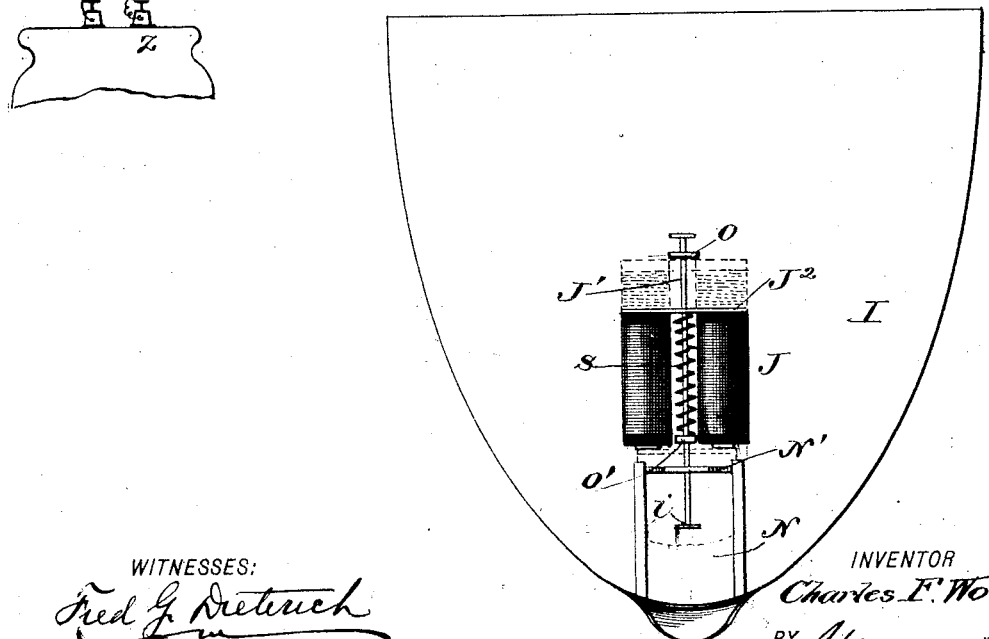

Figure 1 is a side view partly in section of the entire apparatus. Fig. 2 is an enlarged front view of the feed device, and Figs. 3, 4 and 5 are enlarged detail views of the bag filling devices.

In the drawings, A represents the standard of the scales to the upper part of which is fulcrumed the balance beam $A'$ $A^2$, to one end $A'$ of which is suspended a pan for the weight B, and to the other end $A^2$ of which is suspended a weighing receptacle C, for the seed or other merchandise to be weighed.

I is a reservoir hopper mounted above the receptacle C and adapted to discharge into it, and II is a transfer funnel adapted to receive the seed from the receptacle C and transfer the charge to a bag.

E is a box or case upon the top of which is fulcrumed the reservoir hopper I. This hopper has at its lower end next to the scales a sliding door N which is arranged to slide easily in vertical guide ways to close the orifice at the bottom of the hopper. This door N has attached to its upper edge an armature $N'$, arranged to be attracted by the electro magnet J to raise the door and start the discharge of seed. The magnet J is rigidly connected to rod $J'$ and cross bar $J^2$, and the rod $J'$ is arranged to slide vertically with the magnet in arms O $O'$ projecting from the end of the hopper.

Between the cross bar $J^2$ and the projecting arm $O'$, there is disposed a spiral spring S wound about the rod $J'$ upon which the weight of the magnet and its attached parts is sustained in sensitive equilibrium. On the lower end of rod $J'$ is a flat head $i$ which forms a contact face for the end $A^2$ of the balance beam to strike against. This rod $J'$ is connected to one of the terminals of the coil of the magnet J, and the other terminal is connected through wires $a^3$ and $a$ to one pole of the battery Z. The other pole of this battery is, through circuit wire $b$, connected to insulated scale standard A, and balance beam $A^2$ $A'$. Now when a weight B is placed in the balances, the end $A^2$ of the balance beam rises to contact with the point $i$, and thus establishes an electric circuit through electro magnet J, which attracting armature $N'$ lifts the door N and allows the seed to be discharged into the weighing receptacle.

I will now describe the object of making the magnet J movable. When the seed is running out through the door into the receptacle C, and as soon as the weight of the seed in receptacle C balances the weight B the receptacle C begins to descend and breaks electrical contact between beam $A^2$ and face $i$, but as there is a stream of seed in mid air in the act of falling through the wide open door these seed are dumped into receptacle C after electrical contact is broken and give a greater weight than is indicated by B. The object in making magnet J movable is to correct this difficulty, and also secure other advantages. With the magnet made adjustable as described, when the end $A^2$ of the beam rises its first effect is to establish the electric circuit through magnet J as described; but the magnet J being held in delicate equilibrium by its spring S, the further movement of beam $A^2$, upwardly, lifts through rod $J'$ the magnet J and pulls the door N farther open. Now when the receptacle begins to settle the beam end $A^2$ drops and with it the magnet J, armature $N'$, and door N are gradually lowered and the stream of falling seed is gradually reduced until only a few seed are in the act of falling at the moment of the break in electrical contact between $A^2$ and $i$, and such of these few seed as happen to be in the air at this moment do not involve any substantial increase in the weight of the charge of seed. It will also be seen that by making the magnet J movable a much greater range of movement is obtained in lifting the door than could be obtained by the limited range of the armature with a stationary magnet. Within the box E is arranged an electro magnet F and a long lever G, having at one end beneath the electro magnet F an armature, and at the other the transfer funnel H, which is rigidly attached to and supported by the same. This lever emerges through an opening in the side of the box and the transfer funnel H is sustained just below the outlet door $e$ of the weighing receptacle C. This door slides vertically in guides, and has at its upper edge an armature $e'$, arranged to be lifted by an electro magnet D, fixed to the side of the receptacle. After the seed are deposited in and weighed by the receptacle C they are to be deposited in the transfer funnel H, and transferred into the bag, a series of which are retained in the bag holder K. On the receptacle C is a bent wire $d$ that is arranged to dip into a mercury column $d'$. This mercury column is connected by wire $a^2$ to electro magnet F, and thence to circuit wire $a$. As soon as the receptacle C descends with the load, electrical contact is made between $d$ and $d'$, and $d$ being connected with one pole of the battery through the scales and wire $b$, and $d'$ with the other pole of the battery through wire $a^2$ and $a$, the magnet F is charged, and attracting the armature of lever G lowers or throws down the transfer funnel H, which, descending, opens the mouth of the bag as will be described farther along. As soon as this movement is effected the door $e$ of the receptacle C is opened and its contents transferred through the funnel H into the bag. To open this door $e$, I complete an electrical circuit through the magnet D immediately after the circuit is established at $d$ $d'$ through magnet F. This second circuit is established by a bent wire $c$ adapted to enter a mercury column $c'$, the wire $c$ being connected through magnet D to the scales and one pole of the battery, and the mercury column $c'$ being connected through wires $a'$ $a$ with the other pole of the battery. Immediately after the movement of lever G (from charging magnet F through contacts $d$ $d'$), there follows the opening of the door $e$ by magnet D through the circuit established at $c$ $c'$, the circuit being divided between the two magnets D and F. In making contact for the two circuits of the electro magnets F and D, I prefer the mercury columns or cups as shown, since they do not interfere with the free movement of the weighing receptacle C, but I may employ spring contacts, slides, or any other form of electrical contacts for this purpose.

I will now describe the bag filling devices, and their operation in connection with the features already described. K is a bag holder arranged beneath the scales on an incline, and filled with paper bags arranged vertically and pressed forwardly by a roller L which has an angular wire frame $l$ that bears against the tops of the bags and holds them against any tendency to fall back. This frame $l$ is supported at its rear end upon a roller $l^2$. At the lower end of the bag holder the row of bags are held against falling out by a lip $m$ just below the transfer funnel. The bags being stiff stand upright at this point with the mouth immediately beneath the end of the funnel H which in descending penetrates the mouth and expands the same preparatory to delivering the charge of seed into the same. The transfer funnel H is made with one side extended below the other and terminating in a sharp point $h'$. (See Figs. 3, 4, 5.) This point serves to penetrate the narrow space between the sides of the flattened or collapsed bag to open the mouth before discharging the seed into the same, and insures the delivery of the seed upon one side of this point $h'$ and into the mouth of the bag. To this side of the funnel near its top is hinged a pendent bent arm $g$ having near its middle an offsetting weighted arm $g'$, and at its lower end an articulated and pointed toe $g^3$. Within the bend of the arm $g$ there is a stationary bar $g^2$ supported by a portion of the framework, as in Fig. 1, and beside it and under the weight $g'$ there is a rest or contact surface $g^5$. The toe $g^3$ of the arm is jointed so as to bend upwardly, but cannot move downwardly, and just opposite it in the funnel is an opening $h$ into which this toe is adapted to enter in seizing the bag.

The operation of the parts just described is as follows: When the transfer funnel H descends its point enters the mouth of the bag, and the weighted arm $g'$ strikes the contact face $g^5$ and draws the arm $g$ and toe $g^3$ away from the funnel, permitting the paper side $p$ (Fig. 4) of the bag to pass between the funnel and the toe $g^3$. Then after the bag has been filled, and the funnel rises, the toe $g^3$ presses the paper into the opening $h$ of the funnel and indenting or perforating the same lifts the filled bag over the shoulder $m$ until the arm $g$ strikes the stationary bar $g^2$. This throws the arm and toe outwardly, and, releasing the bag, allows it with its charge of seed to drop upon the chute $m$ whence it slides to a suitable shelf below, and is then sealed or closed by hand.

From the foregoing description, it will be seen that the order of automatic action is as follows: First the seed are discharged from the hopper I into the receptacle C and weighed. The receptacle C in descending first establishes the electric current in magnet F, throwing down transfer funnel H, and opening the bag, and immediately following, the electric current is established in magnet D emptying the contents of receptacle C into the transfer funnel H, and thence into the bag. Receptacle C being thus lightened rises and breaking the contacts at c and d allows door e to close, and transfer hopper H to rise and lift the filled bag which is immediately dropped as before described, after which the same action just described is repeated.

In defining the relation of the bag holder and the funnel H to the other features claimed in this case, I would state that I do not make in this case any claim to the special construction of said bag holder and funnel as this has been held to be a separate subject matter. I therefore reserve the right to cover these features in a separate application.

Having thus described my invention, what I claim, and desire to secure by Letters Patent, is—

1. In an electrical weighing scales, the combination with the reservoir hopper and its door, and its scale beam with its weighing receptacle, of an electro magnet with battery circuit arranged to lift the door by the contact of the scale beam, said electro magnet being made bodily movable so as to follow the scale beam up and down and lift the door by mechanical as well as electrical action, substantially as shown and described.

2. The combination hopper I having door N with armature N'; the electro magnet J with rod J' and cross bar $J^2$, guiding supports O O', supporting spring S, and the scale beam with weighing receptacle arranged to lift the electro magnet and make electrical contact as described.

3. In an electric weighing scales, the combination of the pendent weighing receptacle C having door e with armature e' and electro magnet D, and an electrical contact and battery circuit, said contact being arranged to be closed by the descent of the receptacle C to open its discharge door, as described.

4. In an electric weighing scales, the combination with the scale beam; of the hopper with discharge door N and magnet J arranged above it, the suspended weighing receptacle C with discharge door e and magnet D, the transfer funnel H mounted on lever G, the magnet F and the two electrical circuits and their contacts d d' and c c' arranged to operate in sequence to raise the transfer funnel and discharge its contents of receptacle C therein, substantially as shown and described.

5. The combination with the electrical weighing scales having movable receptacle C, and a bag holder; of a transfer funnel with supporting lever and operating magnet connected with the weighing scales and operated by its circuit, and arranged to transfer the contents of the weighing receptacle to the bag, substantially as shown and described.

6. The combination of the hopper with electrically controlled door N, the scale beam with suspended receptacle C having electrically controlled discharge door, the adjustable transfer funnel H, two electrical circuits with contacts carried by the receptacle C, one circuit being arranged to adjust the funnel, and the other to control the discharge door of the weighing receptacle and bag holding and feeding devices, substantially as shown and described.

CHARLES F. WOOD.

Witnesses:
SOLON C. KEMON,
EDWD. W. BYRN.